Figure 1:
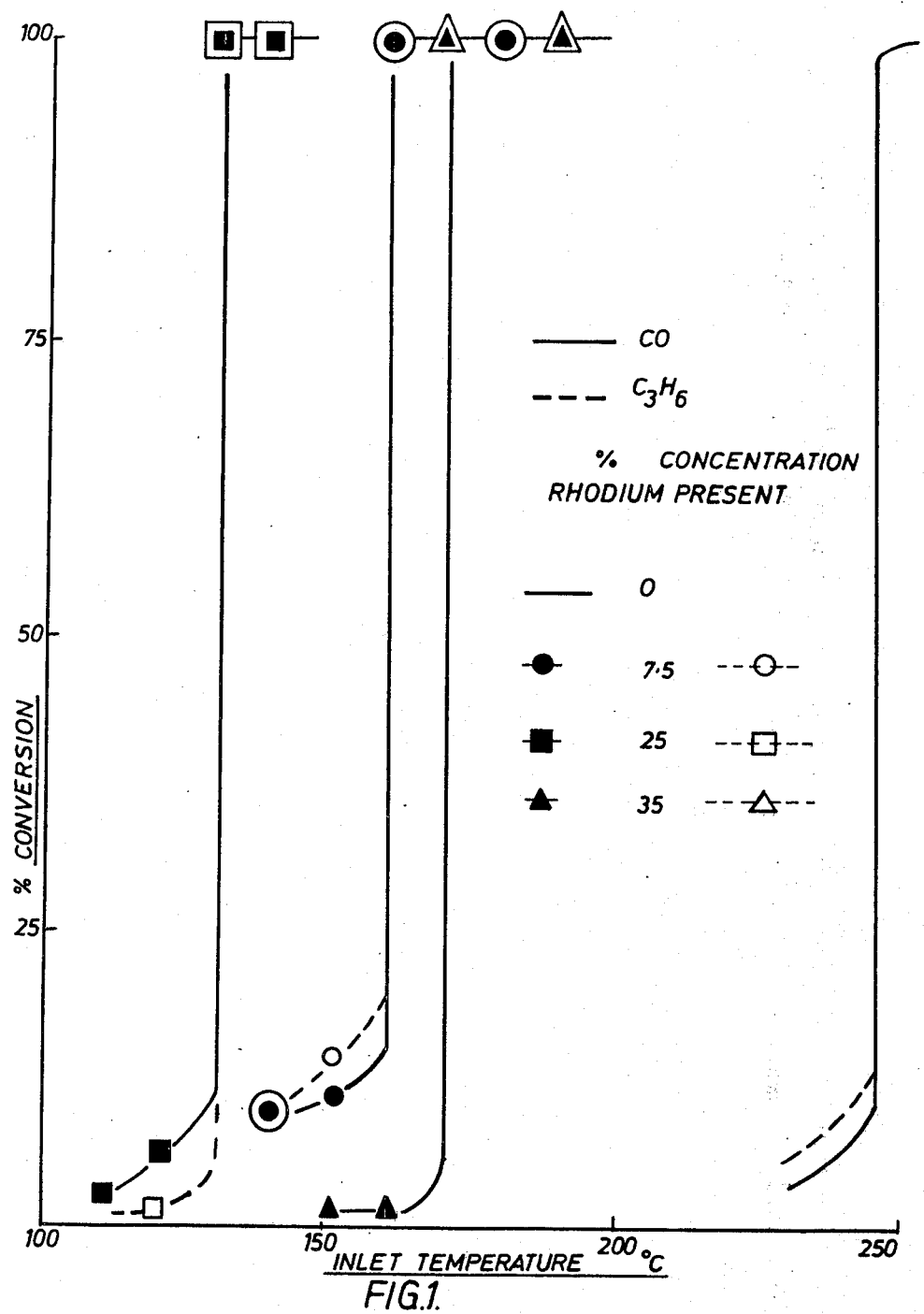

United States Patent [19]

Acres et al.

[11] 3,951,860

[45] Apr. 20, 1976

[54] CATALYST

[75] Inventors: Gary James Keith Acres; Barry John Cooper, both of London, England

[73] Assignee: Johnson, Matthey & Co., Limited, London, England

[22] Filed: Nov. 20, 1972

[21] Appl. No.: 307,823

[30] Foreign Application Priority Data

Nov. 22, 1971 United Kingdom............... 54038/71
Nov. 22, 1971 United Kingdom............... 54039/71

[52] U.S. Cl............................ 252/432; 252/455 R; 252/462; 252/466 PT; 423/213.5
[51] Int. Cl.² .................... B01J 21/02; B01J 23/56
[58] Field of Search............. 252/462, 466 PT, 432, 252/455 R, 455 Z, 460; 423/213, 214

[56] References Cited
UNITED STATES PATENTS

| 3,065,595 | 11/1962 | Gary | 423/213 X |
|---|---|---|---|
| 3,118,727 | 1/1964 | Cohn | 423/239 |
| 3,259,453 | 7/1966 | Stiles | 423/214 |
| 3,346,328 | 10/1967 | Sergeys et al. | 423/213 |
| 3,397,154 | 8/1968 | Talsma | 252/463 |
| 3,476,508 | 11/1969 | Kearby et al. | 423/213 |
| 3,565,574 | 2/1971 | Kearby et al. | 423/213 |
| 3,565,830 | 2/1971 | Keith et al. | 252/466 PT |
| 3,615,166 | 10/1971 | Hindin et al. | 252/466 PT |
| 3,741,725 | 6/1973 | Graham | 252/466 PT |

FOREIGN PATENTS OR APPLICATIONS

| 413,967 | 7/1934 | United Kingdom | 423/214 |
|---|---|---|---|
| 623,256 | 7/1961 | Canada | 423/239 |
| 662,460 | 12/1951 | United Kingdom | 423/213.2 |

*Primary Examiner*—W. J. Shine
*Attorney, Agent, or Firm*—Cushman, Darby & Cushman

[57] ABSTRACT

This invention relates to a catalyst comprising an inert material impregnated or coated with a mixture or alloy of platinum and rhodium in which rhodium is present in an amount up to 20 wt.%. The catalyst is particularly suitable for use in 1) catalytically reducing an oxide of nitrogen in a gaseous stream, 2) the oxidation of an organic compound in a gas also containing oxygen and 3) the preparation of methane by the steam reforming of naphtha or naphtha distillates.

5 Claims, 7 Drawing Figures

CATALYST

This invention relates to catalysts for the catalytic oxidation of organic compounds, catalytic reduction of oxides of nitrogen with a reducing fuel and to catalysts for use in the production of methane by the steam reforming of naphtha and naphtha distillates. More particularly, the invention relates to the catalytic vapour phase oxidation of carbon-containing compounds such as carbon monoxide and the lower hydrocarbons, for example, methane and ethane. The invention also relates to processes in which such reactions may be effected.

Methane is at the present time, as a result of its relative cheapness and its presence in natural gas from the North Sea and other areas, coming into increasing prominence as a reducing fuel. It may be oxidised in a number of industrially important processes.

Unburnt hydrocarbons partially oxidised hydrocarbons, oxides of nitrogen and carbon monoxide contained in internal combustion engine exhausts and a wide variety of other organic compounds, produced by well established processes in the chemical industry, present serious problems of atmospheric contamination. Effluents produced include those from engines, industrial paint baking ovens, printing presses, wire enamelling and solvent cleaning operations, solvent storage tanks and from chemical reactions such as the manufacture of ethylene and ethylene oxide to mention but a few examples.

The oxide of nitrogen which is present in diesel exhaust gases is mainly nitric oxide. This is produced during the combustion of diesel fuel by the combination of nitrogen and oxygen at the high temperatures and pressures present in a combustion chamber. The presence of nitric oxide in the exhaust gases is particularly hazardous when the engine is used in a confined space.

Any engine operating parameter that reduces the combustion temperature will reduce the nitric oxide concentration. For example, retarding the engine, increasing the fuel concentration, reducing the compression ratio, reducing the maximum power output of the engine, and recycling the exhaust gases all lead to a reduction in nitric oxide levels.

Unfortunately, a number of these modifications which reduce nitric oxide levels also increase the CO and hydrocarbon content of the exhaust gases and therefore cannot be used without an exhaust gas purification unit.

Catalytic combustion is a well established procedure for the elimination of many of the components present in the exhaust from a diesel engine. The catalytic system works by promoting the combustion of the carbon monoxide, hydrocarbons, aldehydes, etc., that are present in the exhaust gases with oxygen. The products of this reaction are carbon dioxide and water, which of course, are odourless and nontoxic. Unlike the petrol engine, there may be up to 20% excess air in the exhaust gases of diesel engines, and this will provide adequate oxygen for the combustion reaction. All that is necessary, therefore, for catalytic diesel exhaust purification is the installation of a catalyst chamber into the exhaust system from the engine.

As the catalytic combustion reactions are more effective the higher the exhaust temperatures, it is preferable for the catalytic unit to be installed as close to the exhaust manifold as is practical.

Generally speaking, with catalytic oxidation the reaction takes place at a much lower temperature than that required by direct combustion technique and, because it is a surface reaction, is less influenced by the concentration of the reactants.

For safety reasons the concentration of combustible fume in plant air streams does not exceed 25% of the lower explosion limit and cannot therefore be ignited. The fume concentrations encountered in air pollution problems may range from 1 to 1000 ppm and for combustion to take place, the fume laden air must be raised to the autogenous ignition temperature. This temperature will depend upon the chemical composition of the fume. It is rarely below 500°C and may be as high as 1000°C for complete combustion.

The cost of the fuel required to achieve these temperatures is more often than not prohibitive and in some cases may be higher than the operating cost of the process generating the fume. Therefore, although combustion is an attractive method of destroying organic pollutants because it is continuous and produces no effluent, a means of reducing the reaction temperature is required to make the process more economic.

Hydrocarbons such as methane and ethane and other organic components emitted in the exhausts of diesel engines under medium or high load conditions require relatively high catalyst temperatures before reaction occurs. Thus, if a catalyst could be made which was active for methane and the lower hydrocarbons at substantially lower reaction temperatures it would constitute a substantial advance over the existing process. Similarly, in the use of a supported catalyst metal for air-pollution abatement (frequently known as "NOX abatement") the most difficult fuel to use is methane as it requires high catalyst temperatures before the reaction occurs. Methane is, however, one of the cheapest fuels available and if a catalyst could be made which was active for methane at substantially lower reaction temperatures, it would also constitute a substantial advance over the existing processes.

Production of nitric acid by the oxidation of ammonia normally results in a tail or waste gas containing noxious NO and $NO_2$. The presence of oxides of nitrogen in the tail gases results from the incomplete conversion of the nitrogen oxides to nitric acid and, as a result, the noxious oxides of nitrogen have commonly been discharged into the atmosphere. The discharge of these oxides of nitrogen to the atmosphere is undesirable since they are corrosive and present risk of injury to vegetable and animal life.

The tail gas from nitric acid plants in which ammonia is oxidised typically contains, by volume, from 0.1 to 0.5% of NO, a trace to 0.3% of $NO_2$, from 2 to 5% of $O_2$, and the balance inert constituents, e.g. nitrogen and argon. Additionally, $N_2O$ may also be present in amounts from a trace up to 1% by volume and also water vapour in an amount up to 5% by volume.

For air pollution abatement it is desirable to remove all, or substantially all of the nitrogen oxides before venting the tail gas to the atmosphere. However, both incomplete and complete removal of the nitrogen oxides are of commercial interest. It is an object of the present invention to enable more efficient purification of tail gases than heretofore has been possible by known processes.

At present commercial NOX systems using natural gas as fuel are not very satisfactory when compared with those systems using more expensive fuels such as $H_2$ or naphtha. Because of the high catalyst inlet temperature a two bed catalyst system is always necessary and in many cases poor fuel conversion efficiency, poor NOX abatement and a very short catalyst life are reported.

It is an object of this invention to provide a catalyst enabling ignition to take place at a low temperature, thus enabling a low temperature of the inlet gas stream to be achieved. In a purification process involving the catalytic reduction of oxides of nitrogen, reducing fuel such as hydrogen, carbon monoxide, ammonia, a normally gaseous hydrocarbon, natural gas, or other hydrocarbon gases or liquids, is injected into the stream of tail gas and reacted with the nitrogen oxides in the stream. When the fuel stoichiometrically exceeds the nitrogen oxides and oxygen, the nitrogen oxides are reduced to exceedingly low concentrations. Because of the large gas flows involved in the manufacture of nitric acid (typically about one million standard cubic feet of gas per hour in a plant having a nitric acid production of 240 tons per day), the catalysts are required to have a high level of activity and the reactors are required to be capable of handling large gas flows.

Many nitric acid plants use high pressure processes in the ammonia oxidation step, and it is highly advantageous to recover from the plant tail gas energy which can be utilised to supply power to the system. In some systems sufficient energy can be recovered for the process to be self-sustaining and even to provide additional power. In such systems it is important that the catalyst be highly active, exhibit a minimum resistance to gas flow and catalyse the reaction at low initial reaction or ignition temperatures.

Catalysts in purification processes are often subjected to temperatures in excess of 500° C for considerable lengths of time. A major factor producing deactivation of the catalyst is the inability of the refractory oxide support to withstand the temperatures and corrosive conditions obtaining for long periods of time. The catalyst must therefore have reasonably high (750°–800°C) temperature stability. Equivalent problems are associated with the use of natural gas (which is mostly methane but includes a certain amount of $H_2$).

Important advantages of low ignition temperature are:
a. better fuel conversion efficiency and lower running costs (that is, in those cases where the organic effluent is being used as a fuel);
b. a higher percentage removal of noxious gases escaping into the atmosphere;
c. smaller heat exchangers and a cheaper reactor system may be used, and
d. it makes possible the use of a single catalyst bed instead of a dual or other more complicated system.

It is an object of this invention to provide a process whereby ignition of organic contaminants may take place at a low temperature, thus enabling them to be more completely removed from an effluent gas escaping into the atmosphere.

Air pollution control by catalytic combustion imposes a number of restrictions on the type of catalyst which may be used. In addition to a requirement that the catalyst should be active at low temperatures, it must also be stable under both oxidising and reducing conditions. The catalyst when packed into a reactor should have a very low pressure drop across the bed and it should be resistant to attrition, thermal shock and clogging by dust particles.

Up to the present time platinum has been the preferred catalyst for air pollution control. In the conventionally supported form platinum is more active than the best of the base metal catalysts, it is stable up to at least 750°C and is resistant to poisoning by most elements except lead and phosphorus.

Supported platinum has been used, as have base metal catalysts, in pelleted form but pressure drop problems through the catalyst bed and attrition between the individual catalyst pellets impose severe limitations on the design of the catalyst reactor.

The concentration of organic compounds in the fume is also important. In most cases, the concentration does not significantly affect the ignition temperature. A notable exception however is methane. The concentration of the fume and its composition does, however, determine the amount of oxygen that will be consumed and the temperature rise that will occur on the catalyst. This may be calculated and used in the design of the abatement plant. Where it is significant, the heat generated may be used to sustain the oxidation or recycled to maintain the temperature of the process gas.

The temperature of the gas stream containing the fume to a large extent determines the design of the plant required for pollution control. When the temperature is above that required for ignition, the catalyst may be placed directly in the gas stream. Examples of this use are wire-enamelling ovens, some paint-drying ovens, self-cleaning cookers and diesel or internal combustion engine exhaust systems.

According to the present invention a process for the removal of an oxide of nitrogen from a gas stream comprises passing the gas together with a gaseous reducing fuel at an elevated temperature through a supported catalyst comprising an inert material impregnated or coated with a mixture or alloy of platinum and rhodium metals in which rhodium constitutes less than 20% by weight of the total metal content.

According to a second aspect of the present invention, a process for the oxidation of an organic compound or carbon monoxide in a gas which also contains oxygen comprises passing the gas at an elevated temperature through a supported catalyst comprising an inert material impregnated or coated with a mixture or alloy of platinum and rhodium metals in which rhodium constitutes less than 20% by weight of the total metal content.

According to a third aspect of the present invention a catalyst for (1) the oxidation of carbon monoxide or of organic compounds which would otherwise cause atmospheric contamination or (2) the reduction of oxides of nitrogen by a gaseous reducing fuel, or (3) the production of methane by the steam reforming of naphtha or naphtha distillates comprises an inert material impregnated or coated with said mixture or alloy of platinum and rhodium metals in which rhodium constitutes less than 20% by weight of the total metal content.

In all aspects of the invention the inert material is preferably in corrugated cellular form and more preferably is a rigid porous refractory honeycomb structure. Preferably also the inert material has a first coating of a high surface area refractory oxide and said coating is then further impregnated or coated with said mixture or alloy of platinum and rhodium metals.

We prefer to use a Rh-Pt alloy containing at least 1% by weight Rh.

Conveniently, 5 to 15 weight%, (preferably 7.5 weight %) of the total metal in the mixture or alloy is rhodium.

The inert rigid porous refractory honeycomb structure may be made of a ceramic material. Suitable ceramic materials are zircon-mullite, mullite, alpha alumina, sillimanite, magnesium silicates, zircon, petalite, spodumene, cordierite, and aluminosilicates. Suitable proprietary products are "Torvex" (Registered Trade Mark) sold by E. I. Du Pont de Nemours & Co. Washcoated "Thermacomb" (Registered Trade Mark) sold by the American Lava Corporation and "Mattecel" (Trade Name) sold by Matthey Bishop Inc. Another useful product is described in British Pat. No. 882,484 (Corning Glass Works).

Catalysts according to the present invention may be used for the production of methane by the reforming or steam-reforming of naphtha. Significant quantities of methane are produced by the passage of naphtha feedstocks at high temperature (preferably 300°C) through the above described Pt-Rh catalysts. This process has application where natural gas supplies are not readily available.

According to another aspect of the present invention, a process for (1) the oxidation of carbon monoxide or an organic compound which would otherwise cause atmospheric contamination or (2) the reduction of an oxide of nitrogen by a gaseous reducing fuel, or (3) the production of methane by the steam-reforming of naphtha or naphtha distillates comprises passing the gas at an elevated temperature through a supported catalyst comprising an inert rigid, porous, refractory honeycomb structure impregnated or coated with a mixture or alloy of platinum and rhodium metals in which rhodium constitutes less than 20% by weight of the total metal content.

By "elevated temperature" we mean a temperature sufficient for catalytic oxidation of a significant quantity of the organic compound or catalytic reduction of a significant quantity of the oxide of nitrogen etc., to occur as a result of contact with the catalyst of the invention. For example, in the case of producing methane by reforming naphtha, the "elevated temperature" is 300°C. In the oxidation of organic compounds e.g. benzene, carbon monoxide and propylene, the elevated temperatures are 180°C, 150°C and 200°C respectively.

Preferably, the first (or intermediate) coating upon the refractory honeycomb structure is a refractory oxide such as alumina or magnesia. We have found that a much more stable catalyst results if up to 25% by weight of a rare earth oxide, preferably about 5% by weight, is present.

As stated, the first (or intermediate) oxide coating upon the refractory honeycomb structure may contain one or more of the oxides of the metals of Group IIIB (that is scandium, yttrium and the lanthanides) as the simple oxide or in bound form when ion-exchanged on to a molecular sieve such as a zeolite. The Group IIIB metal oxide may constitute any proportion by weight of the total intermediate high surface area refractory metal oxide coating up to and including 100%. Preferably, however, it is present in proportion from about 5 to 20% by weight, the remainder being constituted by one or more of, e.g. alumina, magnesia, silica, beryllia, boria, titania, zirconia, hafnia, thoria, boria-alumina, silica-alumina, etc.

If, for example, a neodymium exchanged type 13X molecular sieve zeolite (sold by Union Carbide Corporation) is to be used as constituting 10% by weight of the intermediate coating we would prepare this by suspending 100 grams of the sodium form of the zeolite in 500 c.c. of an approximately 5% by weight solution of neodymium nitrate hexahydrate $Nd(NO_3)_3 6H_2O$ also containing approximately 2% by weight of ammonium nitrate. This mixture would be refluxed at 80°–90°C for 18 hours, washed, dried and fired at 500°C for 2 hours. The whole process would then be repeated and would produce a zeolite in which all the sodium had been exchanged for neodymium. The precoating oxide may be in the form of a continuous or discontinuous film of from 0.0004 to 0.01 inch thick. Neodymium oxide is the preferred rare earth metal oxide.

Rhodium constitutes up to 20 wt % preferably, 5 – 15 wt % and, most preferred, about 7.5 wt % of the total metal in the mixture or alloy. In one form 7.5% of the metal in the mixture or alloy is rhodium.

The inert material used in the present invention, on to which the refractory metal oxide (containing rare earth metal oxide) is coated may be any refractory compound which is unreactive with the coating material and which can be prepared in a form which has a high surface area. Preferably, it is also unreactive with any of the gaseous constituents present during the process. Oxides, or mixtures of oxides, of one or more of the following elements may be used as the inert material support: magnesium, calcium, strontium, barium, aluminium, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten and uranium. Compounds such as the carbides, borides, and silicides of the transition metals may also be used. Other suitable ceramic materials which may be used are detailed above.

The refractory metal oxide (which may also contain rare earth oxide) layer is deposited upon the inert ultimate support material either continuously or discontinuously and is preferably in the form of a film from 0.0004 – 0.001 inch thick. This oxide layer is itself characterised by a porous structure and a large internal pore volume and total surface area. Under operating conditions a platinum-rhodium catalyst using this mixture of refractory and rare earth oxides as first or intermediate coating exhibits remarkable oxidation efficiency.

Catalysts according to this invention therefore represent a considerable advance over prior art catalysts.

Suitable active refractory oxides include for example the gamma or active alumina family, active or calcined beryllia, zirconia, titania, hafnia, thoria, magnesia, silica, the lanthanide oxides, for example neodymium oxide, and combination of metal oxides such as boria-alumina or silica-alumina. Preferably the active refractory oxide is composed predominantly of oxides of one or more metals of Groups II, III and IV of the Periodic Table. The active refractory metal oxide deposit may constitute from 1 to 50 weight per cent of the unitary support, preferably from 5 to 30 weight per cent.

A mixture of refractory (and optionally rare earth) oxides may be deposited on to the inert support material in several ways. One method involves dipping the support into a solution of salts of the metals and calcining to decompose the salts to the oxide form. Another and preferred method comprises dipping the support into an aqueous suspension, dispersion or slurry of the oxides themselves, drying and calcining.

In this method suspensions or dispersions having a solid content of from 10% – 70% by weight can be used to deposit metal oxide on to the support in a single application. In order to prepare a catalyst having 10% by weight of alumina/neodymium oxide on a zircon-mullite structure (for example), from 20 – 40% by weight of solids is used in the suspension. The percentage of the solids present is determined on an ignited weight basis (ignited at 1100°C). A particularly preferred method involves forming an aqueous dispersion or slurry as just described and subjecting the mixture to a wet grinding or milling operation whereby the refractory and rare earth metal oxides (which may be zeolite-bound), are reduced to a finely divided form and a thixotropic slip is obtained having the desired consistency, e.g. a solids content of 10 – 70% by weight. The support is then dipped into the slip, dried and calcined. In general, calcining temperatures of from 150°C – 800°C are employed. The calcination is preferably conducted in air, for example, flowing dried air but may be carried out in contact with other gases such as oxygen, nitrogen or flue gas, or under vacuum conditions. The oxide mixture is deposited on the surface of the inert ultimate support material including, if the inert material is a honeycomb, the channel surfaces and superficial macropores in communication with the channel surfaces. The intermediate coating comprises in weight ratio from 1 – 30 and preferably from 5 – 30 wt % of the total weight of coated inert material.

In an alternative embodiment of the present invention, a second intermediate support may also be used. For example, the oxide mixture may be deposited upon particles of alumina, and the so-coated particles themselves may then be deposited upon the inert support material which may also, for example, be made of alumina. Alternatively, it also could be a honeycomb composed of any one of the ceramic materials detailed above. In this way, it is possible to produce a catalyst which presents a very much larger surface area of catalytically active metal to the reacting gases. It will be appreciated that more than one intermediate support may be utilised, depending upon the relative sizes of each of the particles involved. It is, however, not usually necessary to employ more than two intermediate coatings. For example, the structure of the catalyst could be as follows:

a. inert support material in ceramic honeycomb form.
b. particles of second inert material (which may be, but not necessarily is, the same as the first inert material) coated with
c. mixture of refractory and (optionally) rare earth oxides
d. catalytically active metal layer comprising a platinum-rhodium mixture or alloy.

Known methods may be used for preparing structures of this type.

For example, to a colloidal dispersion of alumina in water i.e. hydrated aluminium oxide sol there is added a solution of soluble salts of aluminium and neodymium and an alkali such as ammonium hydroxide solution in sufficient quantity to precipitate the soluble metal salts (as oxides) on to the colloidal aluminium particles. The precipitate may then be filtered and used to prepare a slip which can then itself be used for coating a ceramic honeycomb. The coated inert material particles are preferably between 0.01 and 25 microns in diameter. Further, the inert material may be completely coated with the precipitated mixture of refractory and rare earth metal oxides.

An alternative method is co-precipitation. Solutions of soluble salts of the refractory metal, the rare earth and the inert material oxide precursor (e.g. aluminium nitrate if the inert material is to be alumina) are treated with sufficient alkali, preferably ammonium hydroxide solution, to precipitate all three metal oxides together. However, this method is not so satisfactory and it may be modified by using a slurry of the refractory and rare earth salts.

Impregnation with the mixture or alloy of platinum and rhodium metals may be accomplished by known methods of deposition of catalytically active metals on supports. For example, if a ceramic honeycomb structure is used with a high surface area deposit of refractory and rare earth oxide deposited thereon, the support may be immersed in a solution of water soluble inorganic salt or salts of the platinum and rhodium such as (for example) chloroplatinic acid and rhodium trichloride, agitating the mixture to ensure uniform distribution, and precipitating the metals by chemical or thermal reduction or by precipitating them in a chemically combined state on the support structure. The metal is activated by conventional techniques. After impregnation with platinum and rhodium, the catalyst advantageously may be contacted with hydrogen sulphide to fix the platinum-rhodium metal alloy or mixture in the catalytically active film of oxide as a sulphide. This also gives a more active and suitable catalyst with good dispersion of the platinum-rhodium metal in a form preventing migration of the metal during drying and calcination. Alternatively, an aqueous solution of platinum and rhodium compounds may be reacted with hydrogen sulphide to form a sol, and this sol is applied to the film of intermediate refractory and rare earth metal oxides. Following these treatments the completed catalyst can be calcined within the range of 150°C – 800°C and under conditions as previously disclosed.

It is desirable that the final catalyst has an intermediate support of refractory oxides in the activated or calcined state. It is also known that a ceramic catalyst carrier that has been stabilised by heating to at least 0.4 times its melting point in degrees Kelvin is very much more durable under operating conditions without any sacrifice in the activity of the catalyst. Activation of the intermediate metal oxide film may be carried out prior to depositing it upon the support or subsequent thereto and even after the platinum and rhodium impregnation step. Usually, such material is calcined or partially calcined before deposition on the support but also after such deposition but before deposition of the catalytic platinum-rhodium component. The catalyst containing the platinum-rhodium mixture or alloy may be reduced by contact with molecular hydrogen at elevated temperatures before, during or after calcination.

The amount of platinum and rhodium necessary will vary depending upon the particular ratio selected. In all instances, however, the amount of platinum and rhodium compounds added will be sufficient to provide a small but catalytically effective amount of the material in the final catalyst to catalyse the oxidation of the organic compound present in the gas and which would otherwise cause atmospheric contamination. In general, the total amount of platinum and rhodium may be in the range of, by weight, from 0.05 – 10% preferably 0.5 – 2% (based on total supported catalyst structure).

Concentrations which we have found to be satisfactory are 0.9% w/w and 1.8% w/w.

The catalysts according to the present invention when used in pollution control may be expected to have an active life of at least 2 ½ years. While palladium on intermediate alumina and an ultimate support of ceramic honeycomb exhibits acceptable ignition temperatures, it has been found to be unstable at the temperatures of operation and has been known to fail in one month. Our results indicate that 7.5 wt % rhodium 92.5wt % platinum deposited upon an intermediate support of a refractory and rare earth oxide mixture as described above and an ultimate ceramic honeycomb support produces a catalyst according to the present invention which combines a usefully low ignition temperature with exceptionally high efficiency in the removal of contaminants.

It is preferred that of the catalytically active metal components present (i.e. platinum and rhodium), rhodium constitutes 7.5% by weight of the total. However, 15% Rh has been found very effective in some cases. It is also preferred that the combination of chemical and/or thermal methods of impregnation and reduction are such that an alloy of the two metal components is formed on the surface of the support.

Good results have been obtained for the removal of nitrogen oxides and for the oxidation of methane with the following alloy composition deposited upon intermediate layers of 95% by weight alumina or magnesia and 5% by weight neodymium oxide and an ultimate ceramic honeycomb support:

| Weight Per Cent | |
|---|---|
| Platinum | Rhodium |
| 95.0 | 5.0 |
| 92.5 | 7.5 |
| 90.0 | 10.0 |
| 85.0 | 15.0 |

The present invention also includes gases which have been processed by a method or catalyst according to the invention.

EXAMPLE 1

A series of simulated automobile exhaust tests were carried out upon the effectiveness of various rhodium/platinum mixtures deposited upon ceramic honeycomb supports compared with platinum alone. Effectiveness was measured on the basis of percentage conversion of the undesirable gaseous component relative to inlet temperature into the catalyst. Ideal results are an inlet temperature as low as possible for 100% conversion.

The conditions used were those stipulated in the CVS (constant volume sample) Federal Test Cycle. In each of these tests the exhaust gas had the following composition:

| | | | |
|---|---|---|---|
| CO | 4% | $O_2$ | 3% |
| $C_3H_6$ | 500 ppm | $H_2O(8)$ | 5% |
| NO | 2000 ppm | $N_2$ | Balance |

The pressure under which the gas was passed through a 2-inch diameter reactor containing the catalyst was 1 atmosphere and the space velocity thereof was 50,000 vv/hour.

Figure 2:
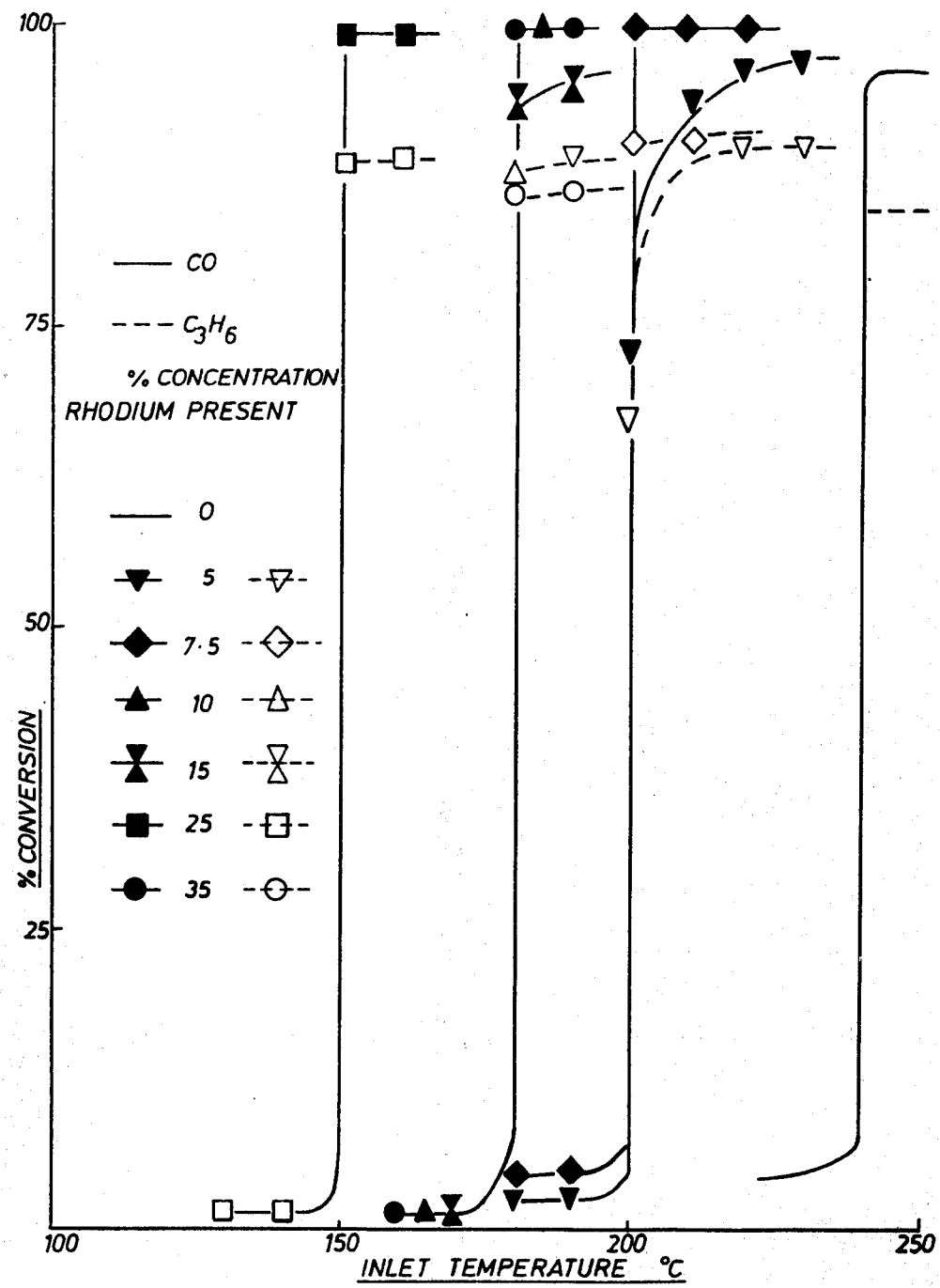

FIGS. 1 and 2 demonstrate the improvement in the form of very much reduced inlet temperatures for almost 100% conversion, when using a series of rhodium-platinum alloys deposited upon two different types of ceramic honeycomb. In FIG. 1 a ceramic honeycomb having 8 corrugations or 16 holes to the inch was used and in FIG. 2 a honeycomb having 4 corrugations or 8 holes to the inch was used. In both cases the ceramic honeycomb had the same alumina washcoat. The lines with unplotted points represent the results for pure platinum. The lines with plotted points represent the results with various ratios of rhodium and platinum, but in all cases the same total quantity of catalytic metal was used.

In FIG. 1 it can be seen that 7.5 wt% of promoter, i.e. rhodium, gives results which are somewhat better than 35% rhodium-platinum.

In FIG. 2 it can be seen that 10 and 15% rhodium-platinum gives results almost identical with those for 35% rhodium-platinum. Results for 5 and 7.5% rhodium-platinum at 200°C are only slightly worse bearing in mind the very much lower quantity of rhodium present.

EXAMPLE 2

In FIGS. 3, 4, 5 and 6 percentage conversions for each of the gases carbon monoxide, nitric oxide and propylene in an exhaust stream having the same composition as described in Example 1 are plotted against oxygen concentration (%) in the exhaust gas for 35, 25, 10 and 5% rhodium-platinum alloys deposited upon an 8 corrugations to the one inch alumina washcoated ceramic honeycomb. Inlet temperature in each case : 450°C.

Figure 3:
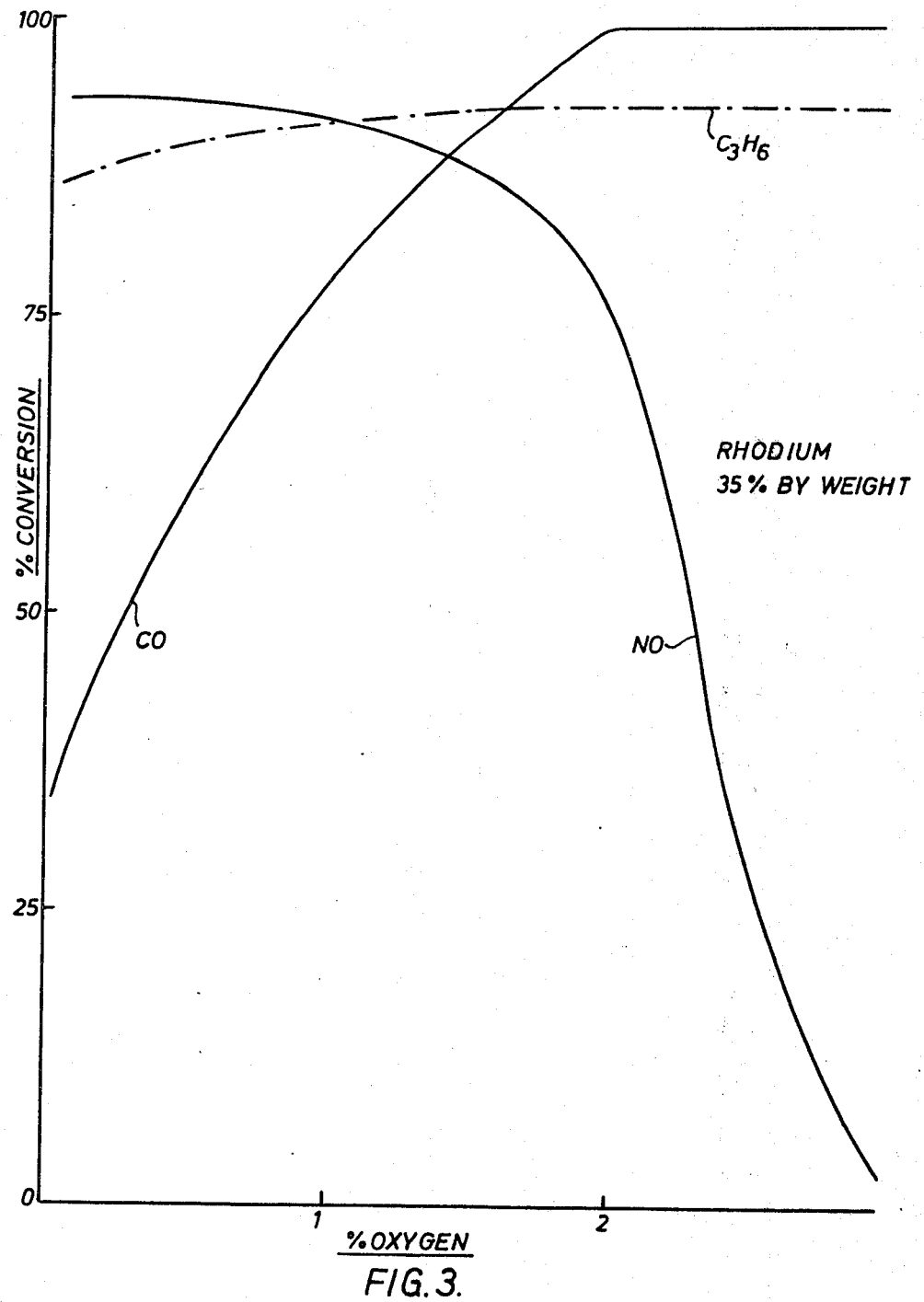
Figure 4:
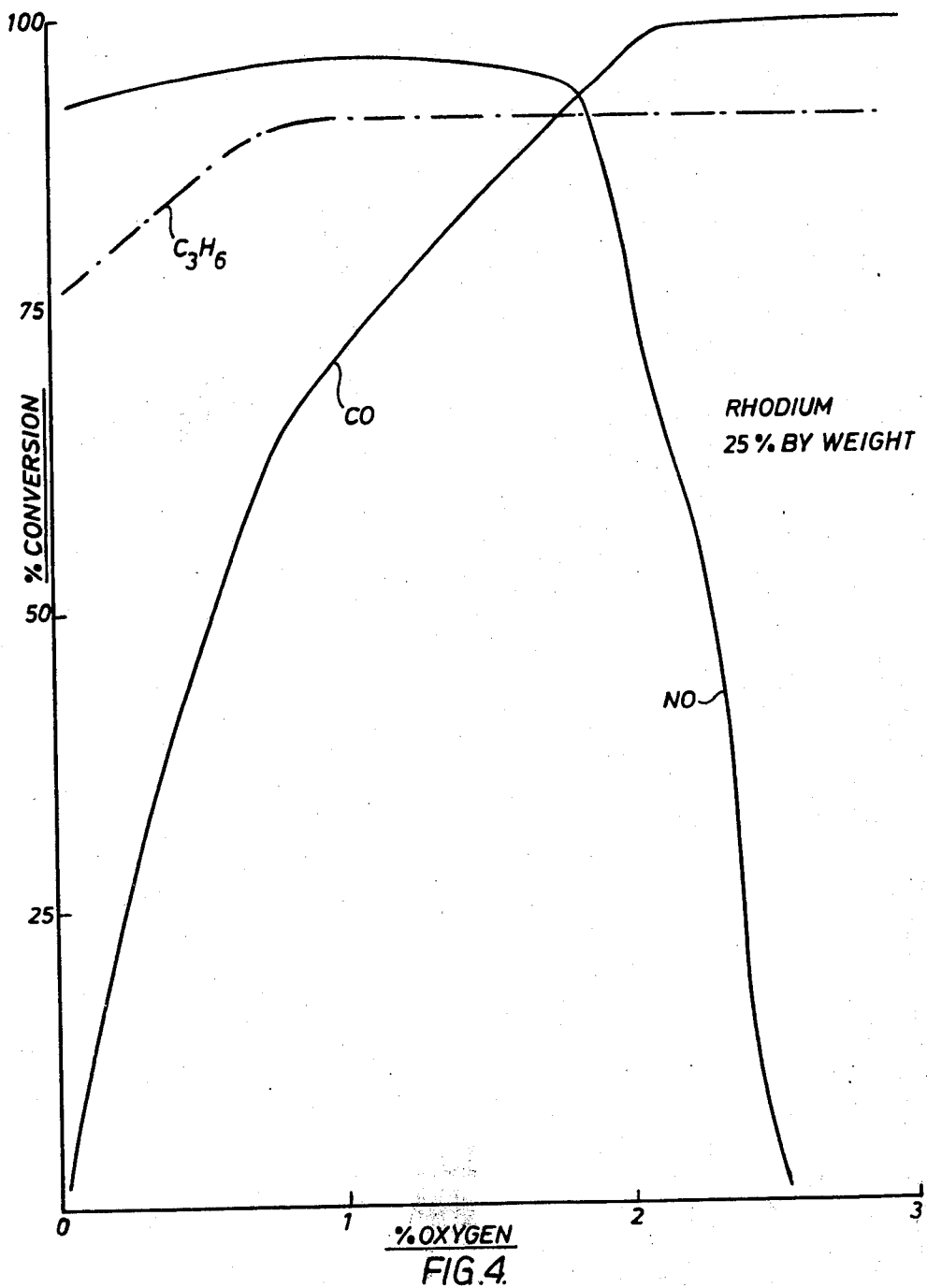
Figure 5:
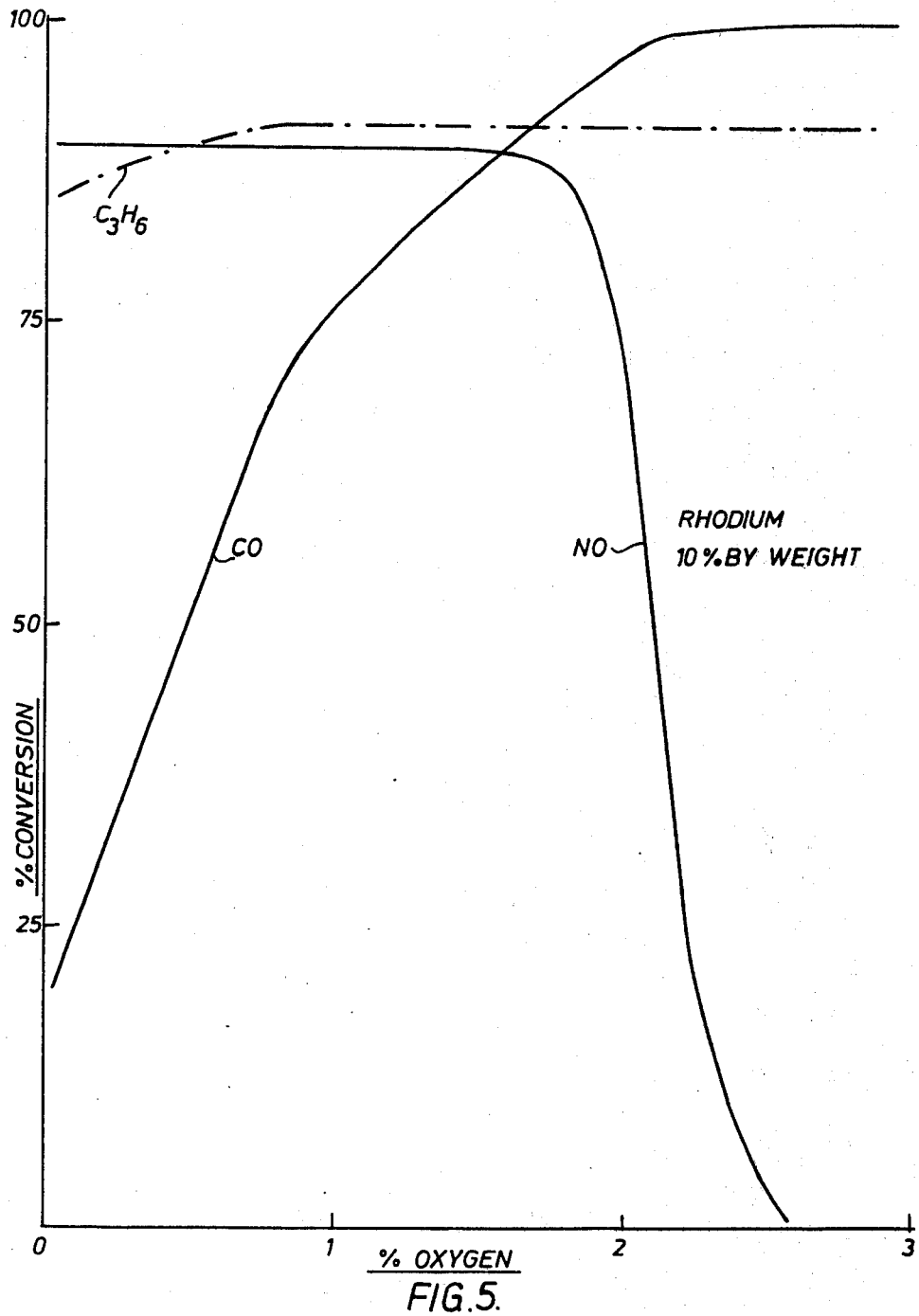
Figure 6:
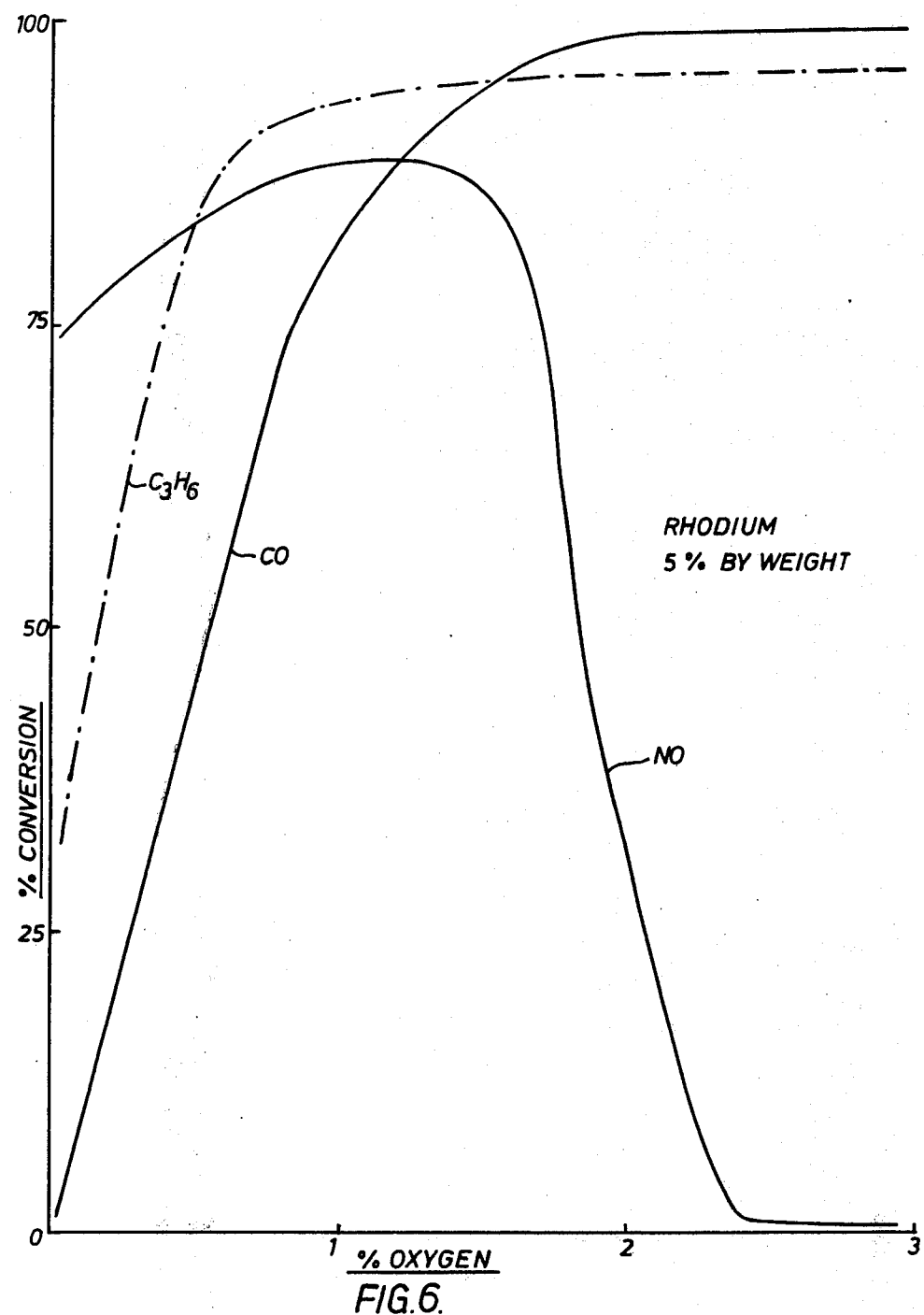

Examination of FIGS. 5 and 6 show that almost equivalent results with 5 and 10% Rh/Pt can be obtained as with the prior art catalysts (FIGS. 3 and 4). In fact, the graphs for carbon monoxide conversion are steeper with the low rhodium catalysts than with the high rhodium catalysts. There is thus a larger window of oxygen concentration (when compared with 25% Rh/Pt) before the nitric oxide conversion begins to fall off. Smaller quantities of rhodium may therefore be used without appreciable deterioration in the quality of the catalysts as regards conversion of noxious exhaust constituents.

EXAMPLE 3

Figure 7:
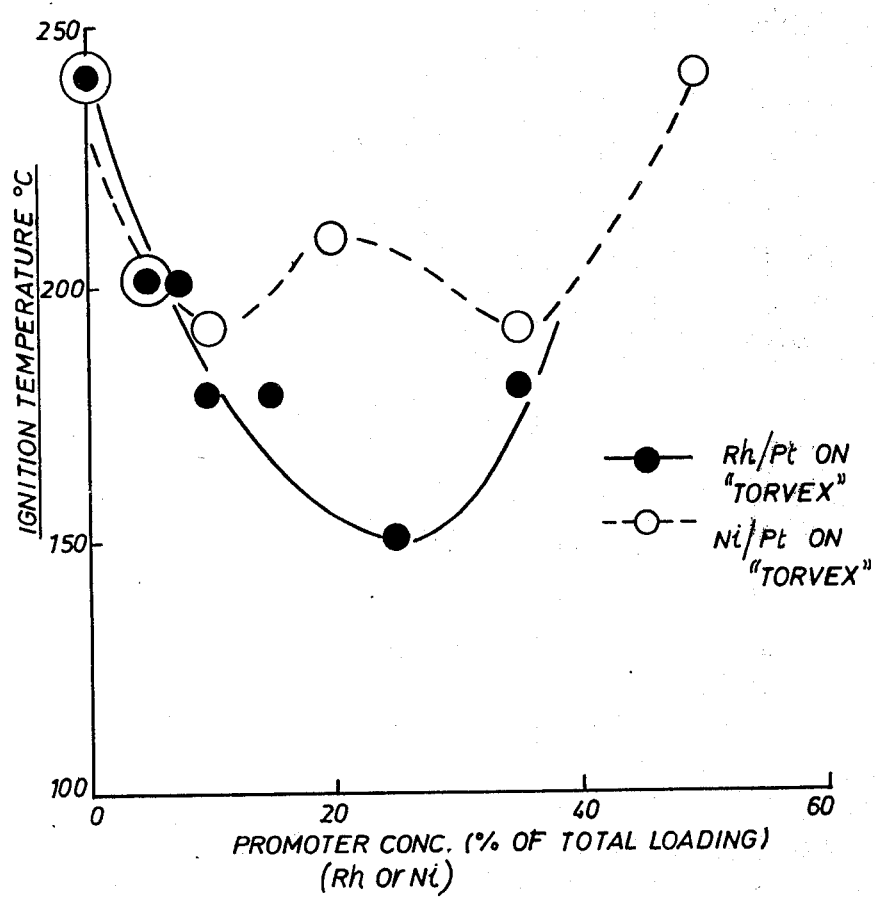

In FIG. 7 the continuous line is a plot of the ignition temperature of a simulated internal combustion engine exhaust gas having the same composition as described in Example 1 (also containing 3% oxygen) against quantity of rhodium present in a Rh-Pt alloy deposited on a ceramic honeycomb having four corrugations (8 holes) to the inch. The same total weight of metal is used throughout. The dashed line shows the effect of a nickel-platinum alloy with variations of the nickel, for comparison.

As low ignition temperatures are desirable, it can be seen that the presence of quite small weight percentages of Rh have a markedly beneficial effect upon the ignition temperature and therefore upon the effectiveness of the catalyst.

What we claim is:

1. A catalyst consisting essentially of an inert porous refractory ceramic material selected from the group consisting of zircon-mullite, mullite, alpha alumina, sillimanite, magnesium silicate, zircon, petalite, spodumene, cordierite and alumina-silicate in the form of a corrugated cellular honeycomb which has applied thereto, as a first coating, a layer or deposit of a mixture of two catalytically active refractory metal oxides which is unreactive with the said inert ceramic material and in which the first of said oxides is selected from the group consisting of an oxide of Be, Mg, B, Al, Si, Ti, Zr, Hf and Th and the second of said oxides is selected from the group consisting of an oxide of Sc, Y and a lanthanide in which the said second metal oxide constitutes from 5–20% by weight of the refractory metal oxide coating and which has applied to the first coating a second coating consisting essentially of a mixture of platinum and rhodium in which rhodium is present in an amount from 1–20 weight percent of the total metal content of the said second coating.

2. A catalyst according to claim 1 in which the said second coating consisting essentially of rhodium and platinum contains from 5–15 weight percent of rhodium relative to the total metal content of the said second coating.

3. A catalyst according to claim 2 in which the second coating of rhodium and platinum contains about 7.5% by weight of rhodium relative to the total metal content of the said second coating.

4. A catalyst according to claim 1 in which the inert ceramic material has been stabilized by heating to at least 0.4 times its melting point in degrees Kelvin.

5. The catalyst of claim 1 wherein the mixture of platinum and rhodium is an alloy of platinum and rhodium containing 7.5% by weight of rhodium, balance platinum.

* * * * *